United States Patent
White

(10) Patent No.: US 8,495,699 B2
(45) Date of Patent: Jul. 23, 2013

(54) DISTRIBUTED CONTENT ANALYSIS NETWORK

(75) Inventor: Scott Anthony White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 586 days.

(21) Appl. No.: 12/342,384

(22) Filed: Dec. 23, 2008

(65) Prior Publication Data

US 2010/0162345 A1 Jun. 24, 2010

(51) Int. Cl.
*H04N 7/16* (2011.01)

(52) U.S. Cl.
USPC ........... 725/146; 725/114; 725/115; 725/116; 725/117; 725/119; 725/145; 725/147

(58) Field of Classification Search
None
See application file for complete search history.

(56) References Cited

U.S. PATENT DOCUMENTS

| | | | |
|---|---|---|---|
| 5,559,975 A | 9/1996 | Christie et al. | |
| 5,574,928 A | 11/1996 | White et al. | |
| 5,590,352 A | 12/1996 | Zuraski, Jr. et al. | |
| 5,632,023 A | 5/1997 | White et al. | |
| 5,649,225 A | 7/1997 | White et al. | |
| 5,689,693 A | 11/1997 | White | |
| 5,696,955 A | 12/1997 | Goddard et al. | |
| 5,737,629 A | 4/1998 | Zuraski, Jr. et al. | |
| 5,764,938 A | 6/1998 | White et al. | |
| 5,799,162 A | 8/1998 | Christie et al. | |
| 5,805,853 A | 9/1998 | White et al. | |
| 5,828,809 A * | 10/1998 | Chang et al. | 386/241 |
| 5,857,089 A | 1/1999 | Goddard et al. | |
| 5,903,772 A | 5/1999 | White et al. | |
| 5,996,067 A | 11/1999 | White | |
| 6,035,386 A | 3/2000 | Christie et al. | |
| 6,041,400 A | 3/2000 | Ozcelik et al. | |
| 6,061,056 A * | 5/2000 | Menard et al. | 715/704 |
| 6,351,801 B1 | 2/2002 | Christie et al. | |
| 6,357,024 B1 | 3/2002 | Dutton et al. | |
| 6,408,379 B1 | 6/2002 | Juffa et al. | |
| 6,442,707 B1 | 8/2002 | McGrath et al. | |
| 6,446,189 B1 | 9/2002 | Zuraski, Jr. et al. | |
| 6,446,215 B1 | 9/2002 | Meyer et al. | |
| 6,493,819 B1 | 12/2002 | Mahurin et al. | |
| 6,542,986 B1 | 4/2003 | White | |
| 6,625,726 B1 | 9/2003 | Clark et al. | |
| 7,051,218 B1 | 5/2006 | Gulick et al. | |
| 7,174,467 B1 | 2/2007 | Helms et al. | |
| 7,263,457 B2 | 8/2007 | White et al. | |
| 7,328,371 B1 | 2/2008 | Kalyanasundharam et al. | |
| 7,350,119 B1 | 3/2008 | Zuraski, Jr. et al. | |
| 7,631,336 B2 | 12/2009 | Diaz Perez | |
| 7,657,843 B2 | 2/2010 | White | |
| 7,665,002 B1 | 2/2010 | White et al. | |
| 7,734,579 B2 | 6/2010 | White et al. | |
| 7,814,115 B2 | 10/2010 | White et al. | |
| 7,860,962 B2 | 12/2010 | White et al. | |
| 2001/0004403 A1 * | 6/2001 | Warnick et al. | 382/173 |

(Continued)

*Primary Examiner* — Cai Chen
(74) *Attorney, Agent, or Firm* — Jackson Walker L.L.P.

(57) ABSTRACT

A distributed content analysis network uses the processing capabilities of customer-premises equipment as subordinate nodes for analyzing multimedia programs. A master node selects a program and identifies subordinate nodes that are available for analysis, which may include both nodes tuned to the program and idle nodes. The master node divides the program into segments for analysis and instructs each subordinate node to analyze a segment. The subordinate nodes then provide analysis results back to the master node, which may build a metadata profile for the program based on the analysis.

19 Claims, 7 Drawing Sheets

U.S. PATENT DOCUMENTS

| | | | |
|---|---|---|---|
| 2001/0005430 A1* | 6/2001 | Warnick et al. | 382/173 |
| 2001/0016008 A1* | 8/2001 | Bahl et al. | 375/240.18 |
| 2002/0112239 A1* | 8/2002 | Goldman | 725/46 |
| 2003/0093790 A1* | 5/2003 | Logan et al. | 725/38 |
| 2003/0217135 A1* | 11/2003 | Chatani et al. | 709/223 |
| 2004/0045020 A1* | 3/2004 | Witt et al. | 725/13 |
| 2006/0218590 A1 | 9/2006 | White | |
| 2007/0036313 A1 | 2/2007 | White et al. | |
| 2007/0036519 A1 | 2/2007 | White | |
| 2007/0038773 A1 | 2/2007 | White et al. | |
| 2007/0038957 A1 | 2/2007 | White | |
| 2007/0061842 A1 | 3/2007 | Walter et al. | |
| 2007/0074258 A1 | 3/2007 | Wood et al. | |
| 2007/0127696 A1 | 6/2007 | White | |
| 2007/0156370 A1 | 7/2007 | White et al. | |
| 2007/0174272 A1* | 7/2007 | Carter et al. | 707/5 |
| 2007/0183745 A1 | 8/2007 | White | |
| 2007/0185968 A1 | 8/2007 | White et al. | |
| 2007/0186247 A1 | 8/2007 | White et al. | |
| 2007/0192822 A1 | 8/2007 | White | |
| 2007/0204118 A1 | 8/2007 | White | |
| 2007/0294721 A1 | 12/2007 | Haeuser et al. | |
| 2008/0098436 A1 | 4/2008 | White | |
| 2008/0104454 A1 | 5/2008 | White | |
| 2008/0109848 A1* | 5/2008 | Li et al. | 725/40 |
| 2008/0126314 A1* | 5/2008 | Thorn | 707/3 |
| 2008/0229257 A1 | 9/2008 | White | |
| 2008/0229362 A1 | 9/2008 | White et al. | |
| 2008/0229372 A1 | 9/2008 | White | |
| 2008/0242357 A1 | 10/2008 | White | |
| 2008/0244668 A1 | 10/2008 | White | |
| 2008/0250358 A1 | 10/2008 | Mitchem et al. | |
| 2008/0263608 A1 | 10/2008 | White | |
| 2008/0263618 A1 | 10/2008 | White | |
| 2008/0271091 A1 | 10/2008 | White | |
| 2008/0282312 A1* | 11/2008 | Blinnikka | 725/153 |
| 2008/0298388 A1 | 12/2008 | White | |
| 2009/0019480 A1 | 1/2009 | White | |
| 2009/0019481 A1 | 1/2009 | White | |
| 2009/0019483 A1 | 1/2009 | White | |
| 2009/0019497 A1 | 1/2009 | White et al. | |
| 2009/0019507 A1 | 1/2009 | White | |
| 2009/0025036 A1 | 1/2009 | White et al. | |
| 2009/0025055 A1 | 1/2009 | White et al. | |
| 2009/0046987 A1 | 2/2009 | White et al. | |
| 2009/0049399 A1 | 2/2009 | White et al. | |
| 2009/0049402 A1 | 2/2009 | White | |
| 2009/0049490 A1 | 2/2009 | White | |
| 2009/0049493 A1 | 2/2009 | White et al. | |
| 2009/0049506 A1 | 2/2009 | White et al. | |
| 2009/0063581 A1 | 3/2009 | White et al. | |
| 2009/0063969 A1 | 3/2009 | White | |
| 2009/0064238 A1 | 3/2009 | White et al. | |
| 2009/0064240 A1 | 3/2009 | White | |
| 2009/0070408 A1 | 3/2009 | White | |
| 2009/0070839 A1 | 3/2009 | Cansler et al. | |
| 2009/0070845 A1 | 3/2009 | White et al. | |
| 2009/0074164 A1 | 3/2009 | Cansler et al. | |
| 2009/0077610 A1 | 3/2009 | White et al. | |
| 2009/0077614 A1 | 3/2009 | White et al. | |
| 2009/0100019 A1 | 4/2009 | White et al. | |
| 2009/0177866 A1 | 7/2009 | Choate et al. | |
| 2009/0183204 A1 | 7/2009 | White | |
| 2009/0183213 A1 | 7/2009 | Mukerji et al. | |
| 2009/0183217 A1 | 7/2009 | Mukerji et al. | |
| 2009/0183222 A1 | 7/2009 | White et al. | |
| 2009/0187944 A1 | 7/2009 | White et al. | |
| 2009/0190734 A1 | 7/2009 | White et al. | |
| 2009/0192870 A1 | 7/2009 | White et al. | |
| 2009/0193453 A1 | 7/2009 | Cansler et al. | |
| 2009/0193482 A1 | 7/2009 | White et al. | |
| 2009/0193489 A1 | 7/2009 | White et al. | |
| 2009/0198588 A1 | 8/2009 | White et al. | |
| 2009/0199234 A1 | 8/2009 | Mukerji et al. | |
| 2009/0199237 A1 | 8/2009 | White et al. | |
| 2009/0199245 A1 | 8/2009 | White et al. | |
| 2009/0199254 A1 | 8/2009 | White et al. | |
| 2009/0199256 A1 | 8/2009 | White et al. | |
| 2009/0199257 A1 | 8/2009 | White et al. | |
| 2009/0204487 A1 | 8/2009 | Cansler et al. | |
| 2009/0204989 A1 | 8/2009 | White et al. | |
| 2009/0204991 A1 | 8/2009 | White et al. | |
| 2009/0204993 A1 | 8/2009 | White et al. | |
| 2009/0210300 A1 | 8/2009 | Cansler et al. | |
| 2009/0210477 A1 | 8/2009 | White et al. | |
| 2009/0210903 A1 | 8/2009 | White | |
| 2009/0210909 A1 | 8/2009 | Mukerji et al. | |
| 2009/0210922 A1 | 8/2009 | White et al. | |
| 2009/0217317 A1 | 8/2009 | White | |
| 2009/0217321 A1 | 8/2009 | White | |
| 2009/0217356 A1 | 8/2009 | Scott et al. | |
| 2009/0222853 A1 | 9/2009 | White et al. | |
| 2009/0222854 A1 | 9/2009 | Cansler et al. | |
| 2009/0228326 A1 | 9/2009 | White | |
| 2009/0228582 A1 | 9/2009 | White et al. | |
| 2009/0228938 A1 | 9/2009 | White et al. | |
| 2009/0228947 A1 | 9/2009 | White | |
| 2009/0235307 A1 | 9/2009 | White et al. | |
| 2009/0241143 A1 | 9/2009 | White et al. | |
| 2009/0241150 A1 | 9/2009 | White et al. | |
| 2009/0249242 A1 | 10/2009 | White | |
| 2009/0249428 A1 | 10/2009 | White et al. | |
| 2009/0271817 A1 | 10/2009 | White et al. | |
| 2009/0271819 A1 | 10/2009 | Cansler et al. | |
| 2009/0271830 A1 | 10/2009 | White | |
| 2009/0276806 A1 | 11/2009 | Anderson et al. | |
| 2009/0282435 A1 | 11/2009 | White et al. | |
| 2009/0282438 A1 | 11/2009 | White | |
| 2009/0293088 A1 | 11/2009 | Mukerji et al. | |
| 2009/0300671 A1 | 12/2009 | Scott et al. | |
| 2009/0300695 A1 | 12/2009 | White et al. | |
| 2009/0319350 A1 | 12/2009 | Cansler et al. | |
| 2009/0325713 A1 | 12/2009 | Cansler et al. | |
| 2009/0328093 A1 | 12/2009 | Cansler et al. | |
| 2010/0005104 A1 | 1/2010 | DiMaria et al. | |
| 2010/0016014 A1 | 1/2010 | White | |
| 2010/0031288 A1 | 2/2010 | Scott et al. | |
| 2010/0043030 A1 | 2/2010 | White | |
| 2010/0061567 A1 | 3/2010 | White | |
| 2010/0064221 A1 | 3/2010 | White et al. | |
| 2010/0083373 A1 | 4/2010 | White et al. | |
| 2010/0088733 A1 | 4/2010 | Chan et al. | |
| 2010/0095243 A1 | 4/2010 | White | |
| 2010/0223660 A1 | 9/2010 | Scott et al. | |
| 2010/0223673 A1 | 9/2010 | Scott et al. | |
| 2010/0226288 A1 | 9/2010 | Scott et al. | |
| 2010/0228547 A1 | 9/2010 | Scott et al. | |
| 2010/0245113 A1 | 9/2010 | Schmehl et al. | |
| 2010/0251299 A1 | 9/2010 | Scott et al. | |
| 2010/0332466 A1 | 12/2010 | White et al. | |
| 2010/0333127 A1 | 12/2010 | Scott et al. | |
| 2011/0010742 A1 | 1/2011 | White | |
| 2011/0047284 A1 | 2/2011 | White et al. | |

* cited by examiner

DISTRIBUTED CONTENT ANALYSIS NETWORK

BACKGROUND

1. Field of the Disclosure

The present disclosure relates to providing multimedia content and more particularly to providing metadata in conjunction with providing multimedia content.

2. Description of the Related Art

In general, a multimedia content network will include a provider that delivers multimedia content to subscribing end users over media such as cable, satellite, or internet protocol television (IPTV). In some cases, providers will provide metadata for programs, which users may see on an electronic program guide (EPG).

DESCRIPTION OF EXEMPLARY EMBODIMENTS

Figure 1:
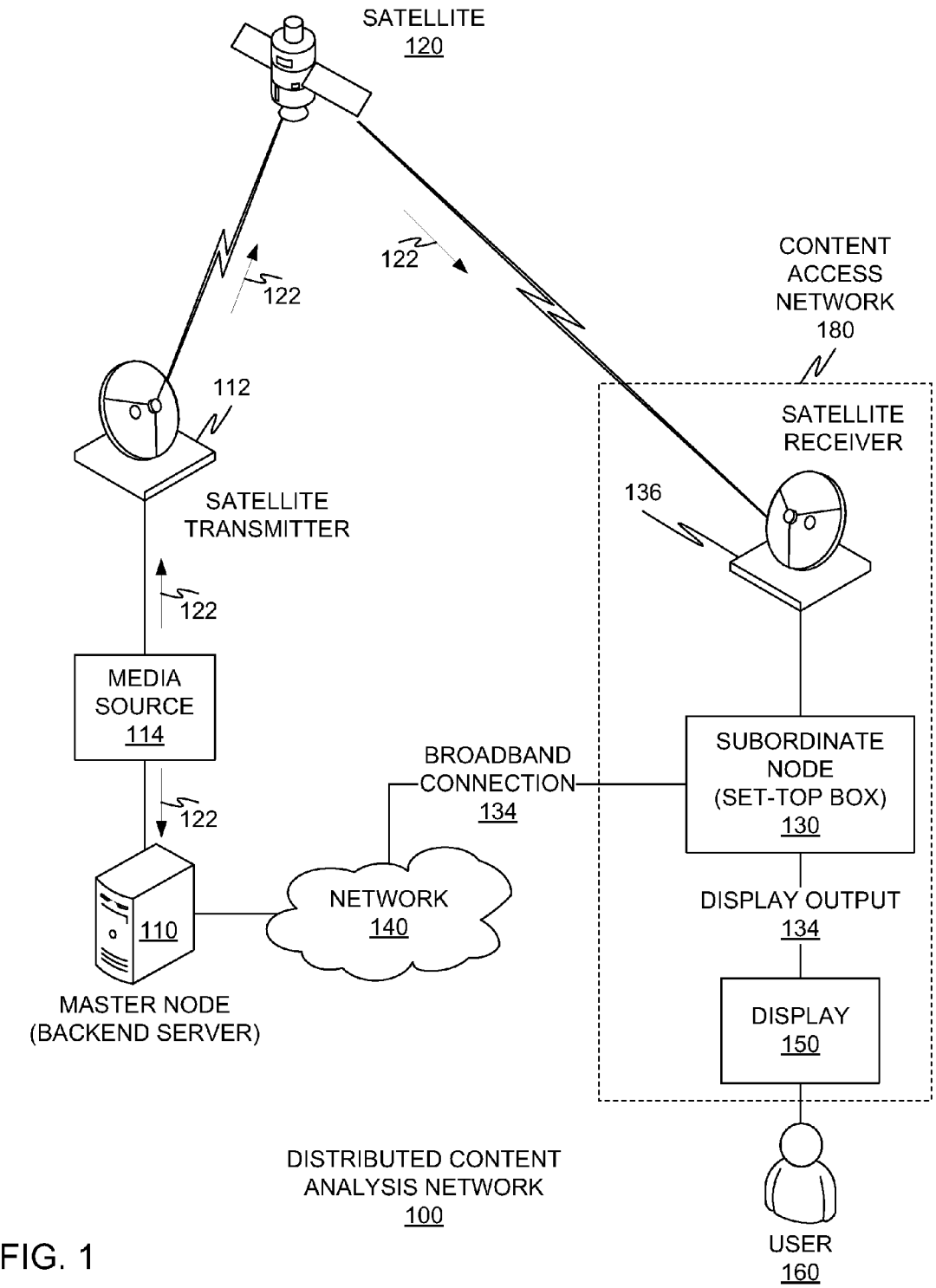
FIG. 1 is a network diagram disclosing an embodiment of a distributed content analysis network.

Embodiments of a distributed content analysis network use the processing capabilities of customer-premises equipment (CPE) as subordinate nodes for analyzing multimedia programs. A master node selects a program and identifies subordinate nodes that are available to perform analysis, which may include subordinate nodes tuned to the program as well as subordinate nodes that are idle. The master node may divide the program into segments for analysis and instruct subordinate nodes to analyze different segments. The subordinate nodes may then provide analysis results back to the master node, which may build a metadata profile for the program based on the analysis.

In a particular embodiment, a distributed content analysis network enables a content provider to harness the processing power of CPE, such as a set-top box (STB), and use the CPE as a subordinate node for program analysis. The STB may have some appreciable processing power, which may be otherwise left idle. But by instructing the STB to perform an analysis task, its processing power can be harnessed to generate rich metadata for multimedia content. Conventional multimedia networks may provide a limited and static form of metadata including, as an example, metadata that supports an electronic programming guide. In contrast, the distributed data analysis disclosed herein extends metadata concepts to encompass metadata captured in real time reflecting aspects of a program not knowable in advance, for example, the demographic composition of a crowd at a football or the names of one or more celebrities at a charitable event.

In conventional networks, a provider showing the program Top Gun may include a minimal description in the EPG, such as, "Top Gun. 1986. PG. 110 min. Tom Cruise. Kelly McGillis. Tom Skerritt. A hotshot fighter pilot attends the Navy's top flight school." Generally, this minimal description will have been written and entered manually. But if the substantial processing power of the many STBs tuned to Top Gun are harnessed, richer metadata can be gleaned. Facial recognition software along with tracking of time on screen may used to determine that Anthony Edwards, Val Kilmer, Michael Ironside, and Meg Ryan also play substantial roles. The software may also locate smaller roles played by James Tolkan, Tim Robbins, Adrian Pasdar, Duke Stroud, and Linda Rae Jurgens. Pattern matching on the credits may be used to determine that the movie was produced by Jerry Bruckheimer, the music was scored by Harold Faltermeyer, and the film was directed by Tony Scott. Pattern matching on closed captioning may be useful for locating and marking famous lines such as "The plaque for the alternates is down in the ladies room," or "The defense department regrets to inform you that your sons are dead because they were stupid." Visual analysis may indicate that Tom Cruise's character flies an F-14, that the instructor pilots fly F-4s, that the fictional "MiG 28s" are actually F-5s, and that the film also features SH-3 and HH-3F rescue helicopters. These data may be correlated with a central database of additional information to further determine, for example, that Tom Cruise was 23 and Kelly McGillis was 28 when the film was released, or that it was the eleventh film produced by Jerry Bruckheimer.

The STB may also record preferably-anonymous metrics based on user interactions. For example, it may be found that a certain number of people watched the film, that a certain percentage of those recorded it on a digital video recorder (DVR), that DVR users skipped certain commercials but watched others, and that certain scenes are popular based on users re-winding and re-viewing those scenes.

In another example, distributed analysis may be used to analyze a sporting event or other live program. For example, in a football game, it may be determined in real-time or near-real-time, that a particular player played 28 minutes of a game and that he completed three passes. The score may also be tracked in real time and provided to the EPG, so that a user scanning through the EPG may be able to see the current state of the game without actually tuning to it.

The rich metadata discussed above may be exploited for various purposes. For example, an EPG may include "drill-down" capabilities so that users can get more details about a specific program, including statistical and personal details about persons involved or the program itself. A user may also be able to pause a program and select a particular portion for further details. For example, a user with a DVR may pause Top Gun and select the fictional MiG-28, whereupon he may be informed that the aircraft is an American F-5E Tiger II. And because some multimedia content systems are connected to the internet, additional results may be available by linking in results from services such as Google or Wikipedia.

In another example, a football fan who is watching the University of Texas (UT)-Texas A&M University (A&M) game on Thanksgiving may be able to open the EPG and discover that 80% of the crowd are UT supporters and that the celebrities in attendance include Matthew McConaughey, Lance Armstrong, and Vince Young.

Other uses of rich metadata will be made apparent by the present disclosure.

A distributed content analysis system will now be described with more particular reference to the attached drawings. In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 is a network diagram of selected aspects of an embodiment of a distributed content analysis network 100. A media source 114, which may be operated by a multimedia service provider such as a television service, provides a multimedia content stream 122 for use in the network. Multimedia content stream 122 may be provided to a satellite transmitter 112, which transmits the stream to a satellite 120. Satellite 120 transmits multimedia content stream 122 to one or more content access networks 180. Content access network 180 may include a satellite receiver 136 connected to a subordinate node 130, which may be implemented as an STB or another suitable type of CPE. In standard operation, subordinate node 130 provides video or multimedia display output 134 to display 150 for viewing and/or listening by user 160. In some embodiments, subordinate node 130 also interfaces to a broadband connection 132, which permits backhaul communication with the service provider via network 140.

A master node 110, which may be a backend server operated by the multimedia service provider, also receives multimedia content from media source 114. Master node 110 may be configured to operate a distributed content analysis network according to the present disclosure.

Although FIG. 1 discloses an embodiment that uses a satellite network, wired networks such as cable or IPTV networks would also be suitable and would operate on analogous principles.

Figure 2:
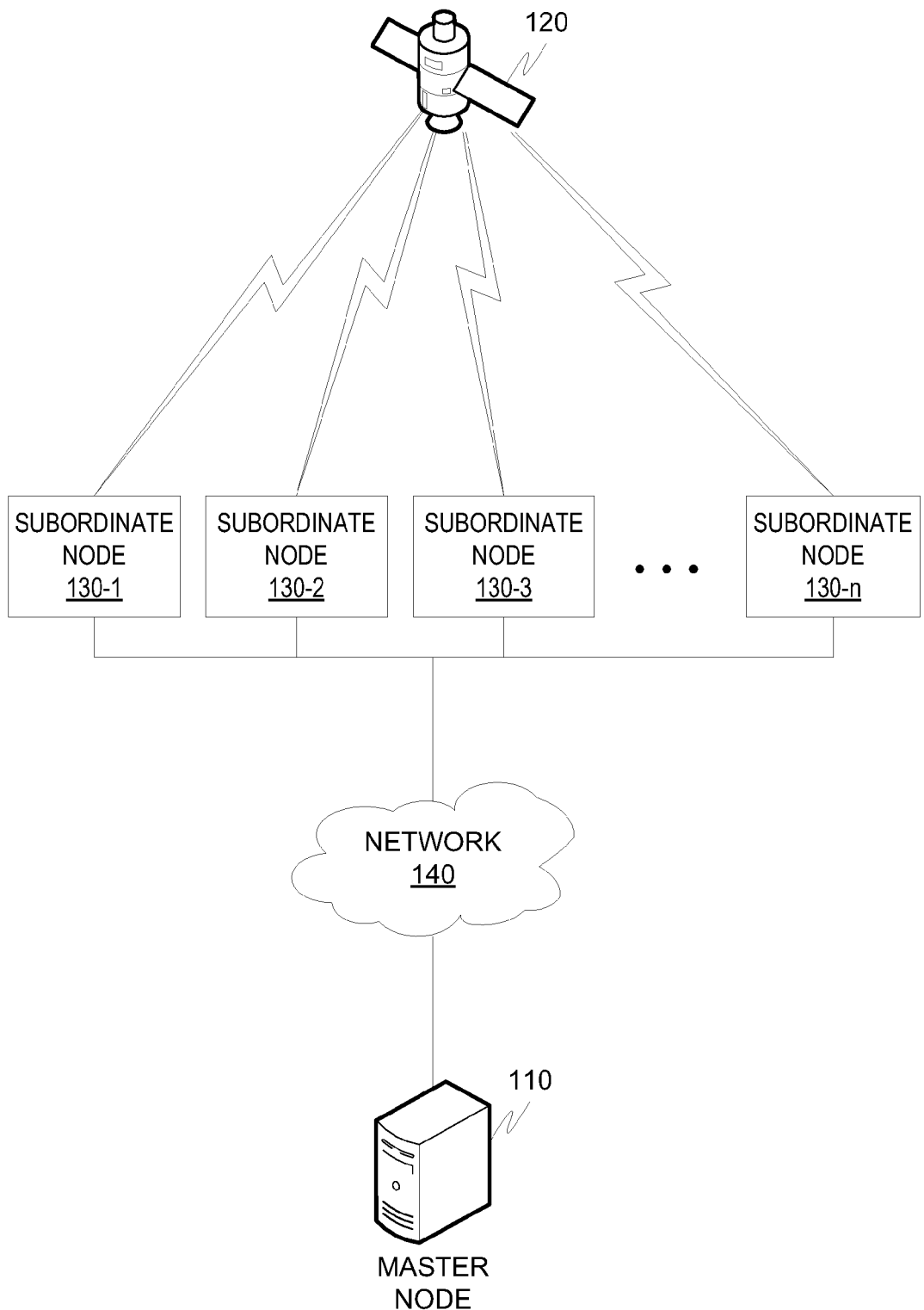
FIG. 2 is a partial network diagram of a distributed content analysis network, disclosing a plurality of subordinate nodes such as set-top boxes receiving a multimedia content stream.

FIG. 2 is a diagram of selected aspects of an embodiment of distributed content analysis network such as the distributed content analysis network 100 of FIG. 1, illustrating a plurality of subordinate nodes 130 such as set-top boxes receiving a multimedia content stream 122. Each subordinate node 130 has the ability to tune to or otherwise receive a program selected by the user, and in some embodiments, analysis tasks are tied to the selected program. For example, subordinate node 130-1 and subordinate node 130-2 may be tuned to Top Gun and subordinate node 130-3 may be tuned to the UT-A&M game. Additional subordinate node 130 may be included in the network, and each may be tuned to a program. Some subordinate node, such as subordinate node 130-n, may be idle, meaning that they are not currently displaying any program to a user. Each subordinate node shown may be configured to operate as a subordinate node in distributed content analysis network 100 (FIG. 1).

Master node 110 may determine that sufficient subordinate nodes 130 are tuned to Top Gun to perform the analysis tasks, but an insufficient number of nodes are tuned to the UT-A&M game. In some cases, "sufficient" may mean 1 or more and "insufficient" may mean 0. In other embodiments, "sufficient" may mean greater than or equal to N where N is the number of segments. Returning to the Top Gun example, master node 110 may assign analysis tasks associated with Top Gun to subordinate node 130-1 and subordinate node 130-2, and analysis tasks associated with the game to subordinate node 130-3. Because there are not enough nodes tuned to the game, master node 110 may also assign some idle nodes, such as subordinate node 130-n analysis tasks associated with the game. In the case of idle nodes such as 130-n, it may also be necessary to provide the program segment to be analyzed.

Figure 3:
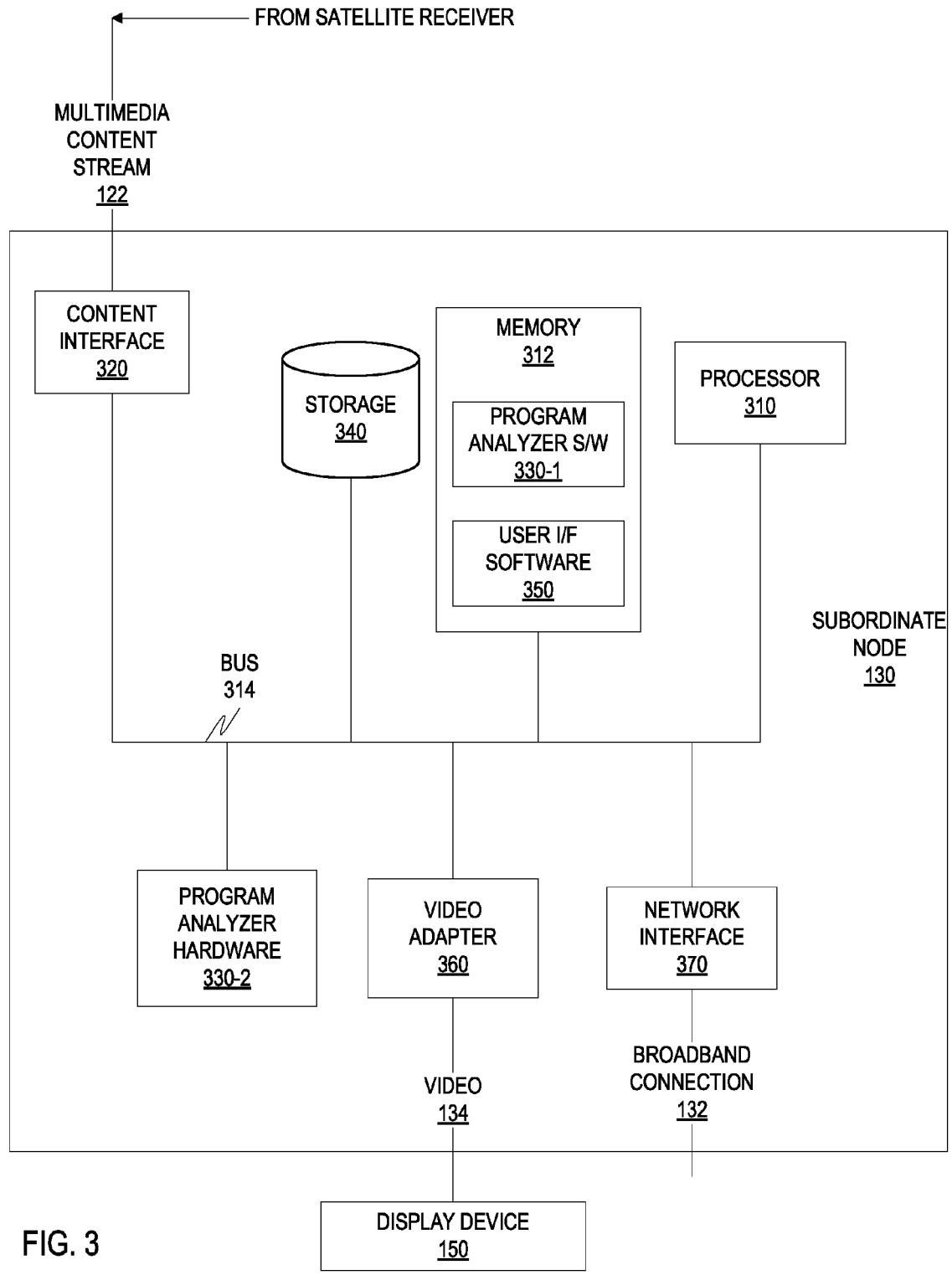
FIG. 3 is a block diagram of a subordinate node for use in a distributed content analysis network.

FIG. 3 is a block diagram of selected aspects of an embodiment of a subordinate node 130 for use in a distributed content analysis network 110 (FIG. 1). In the embodiment disclosed, a bus 314 interconnects various system components. Content interface 320 receives multimedia content stream 122. Network interface 370 communicatively couples subordinate node 130 to broadband connection 132. In some embodiments, content interface 320 and network interface 370 may be a single physical interface (for example, in an IPTV system, multimedia content will be provided via broadband connection 132). A video adapter 360 is also shown, which is configured to provide display output 134 to display device 150. Storage 340 may be a hard disk, solid-state drive, flash memory, or other type of non-volatile memory device. Memory 312 may include computer executable instructions, i.e., software, and data from storage 340, and may be a volatile, low-latency mechanism such as random access memory (RAM). During instruction execution, necessary algorithms, instructions, and data may be temporarily stored in memory 312. Among other processes, memory 312 may include program analyzer software 330-1 and user interface software 350, which may provide a graphical display through which a user may interact with subordinate node 130. Processor 310 may execute software instructions from memory 312 or elsewhere to perform processing functions and regulate interactions between other components. As is known in the art, processor 310 may be a central-processing unit (CPU) or other general-purpose or special-purpose hardware performing a similar function.

Although program analyzer software 330-1 may be purely standalone software, it may also be used in conjunction with special purpose hardware. For example, program analyzer software 330-1 may operate in conjunction with program analyzer hardware 330-2, which may represent an ASIC (application specific integrated circuit) performing a specific type of pattern matching function, such as text-to-speech, voice recognition, face recognition, or text matching. This may be more efficient than a software solution because the particular algorithm will be implemented in hardware. A planned or random distribution of subordinate nodes with different hardware capabilities may be sent to customers, so that some will be dedicated to certain tasks. In other examples, program analyzer hardware 330-2 may include an FPGA (field programmable gate array) or other re-configurable device. Program analyzer hardware 330-2 may be designated for a time as a text-to-speech unit, and program analyzer software 330-1 may be programmed to perform text-to-speech. If there is a greater need later for facial recognition, program analyzer hardware 330-2 may be re-purposed as a facial recognition chip. Even when dedicated hardware is used, it may be necessary to include certain software instructions in memory 312. In some embodiments where at least part of a program analyzer is implemented as program analyzer hardware 330-2, program analyzer software 330-1 may be a part of or share resources with processor 310.

Figure 4:
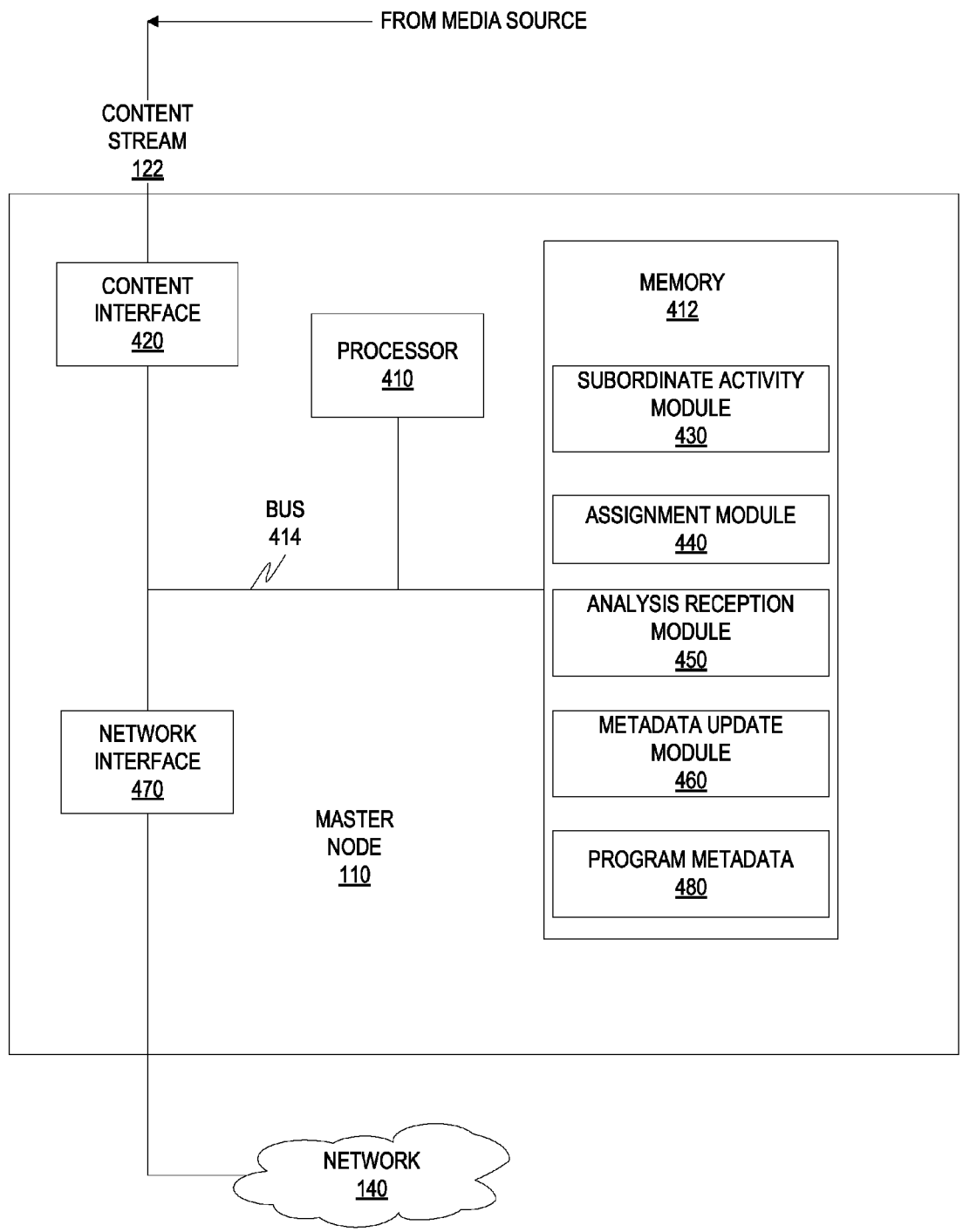
FIG. 4 is a block diagram of a master node for use in a distributed content analysis network.

FIG. 4 is a block diagram of a master node for use in a distributed content analysis network. As with subordinate node 130, master node 110 includes a processor 410, a bus 414, a content interface 420, a network interface 470, and memory 412. These logical units may be similar to the corresponding logical units in subordinate node 130, and the descriptions of those corresponding components above are generally applicable to the logical units of master node 110. Master node 110 may also include a number of modules dedicated to specific activity. Although these modules are shown resident in memory, as with program analyzer 330 (FIG. 3) of subordinate node 130, these functions may be implemented in an appropriate mixture of software and/or dedicated hardware.

Subordinate activity module 430 may be configured to determine which subordinate nodes are idle, which are active, and for active subordinate nodes, which subordinate nodes are tuned to which program. Assignment module 440 determines how many subordinate nodes are available for a certain program. Based on the number of available subordinate nodes, assignment module 440 may subdivide the program into functional, spatial, and/or temporal segments. For example, assignment module 440 may designate a 5-minute temporal segment of a program for facial recognition, or it may designate a certain sector of the screen for facial recognition, or some combination thereof. In other embodiments, a program may be analyzed in its entirety by a single subordinate node without segmentation.

Analysis reception module 450 may receive and process results of the analysis after subordinate nodes 130 have completed their tasks. Assignment module 440 and analysis reception module 450 may operate in a feedback loop. For example, assignment module 440 may first assign a number of nodes to perform high-level analysis, to determine that certain portions of the program primarily feature people, other portions primarily feature vehicles, and some portions feature crowds of people. Master node 110 may use this high-level analysis as a basis for assigning more specific tasks, such as assigning subordinate nodes to perform facial recognition on people in a particular scene. This feedback loop may also be iterative. For example, on a first pass, subordinate nodes 130 may determine that a certain scene primarily features people. Master node 110 may then divide the scene into spatial segments, with each segment including one or more faces for analysis, and may assign certain subordinate nodes 130 the task of characterizing the faces in the scene. Once subordinate nodes 130 have returned characteristic profiles of the faces, master node 110 may search a database of celebrities to find detailed profiles. Master node 110 may then send a subset of celebrities matching the profile to certain subordinate nodes 130, and instruct the subordinate nodes 130 to perform a more detailed analysis. On this iteration, one or more subordinate nodes may match the face to a celebrity with a particular degree of certainty.

Based on matches to certain patterns or other data gleaned from the analysis process, metadata update module 460 may select some or all of the data for inclusion in a metadata profile. Metadata update module 460 may include algorithms for classifying types of data and compiling those into a profile, which are updated as program metadata 480.

Figure 5:
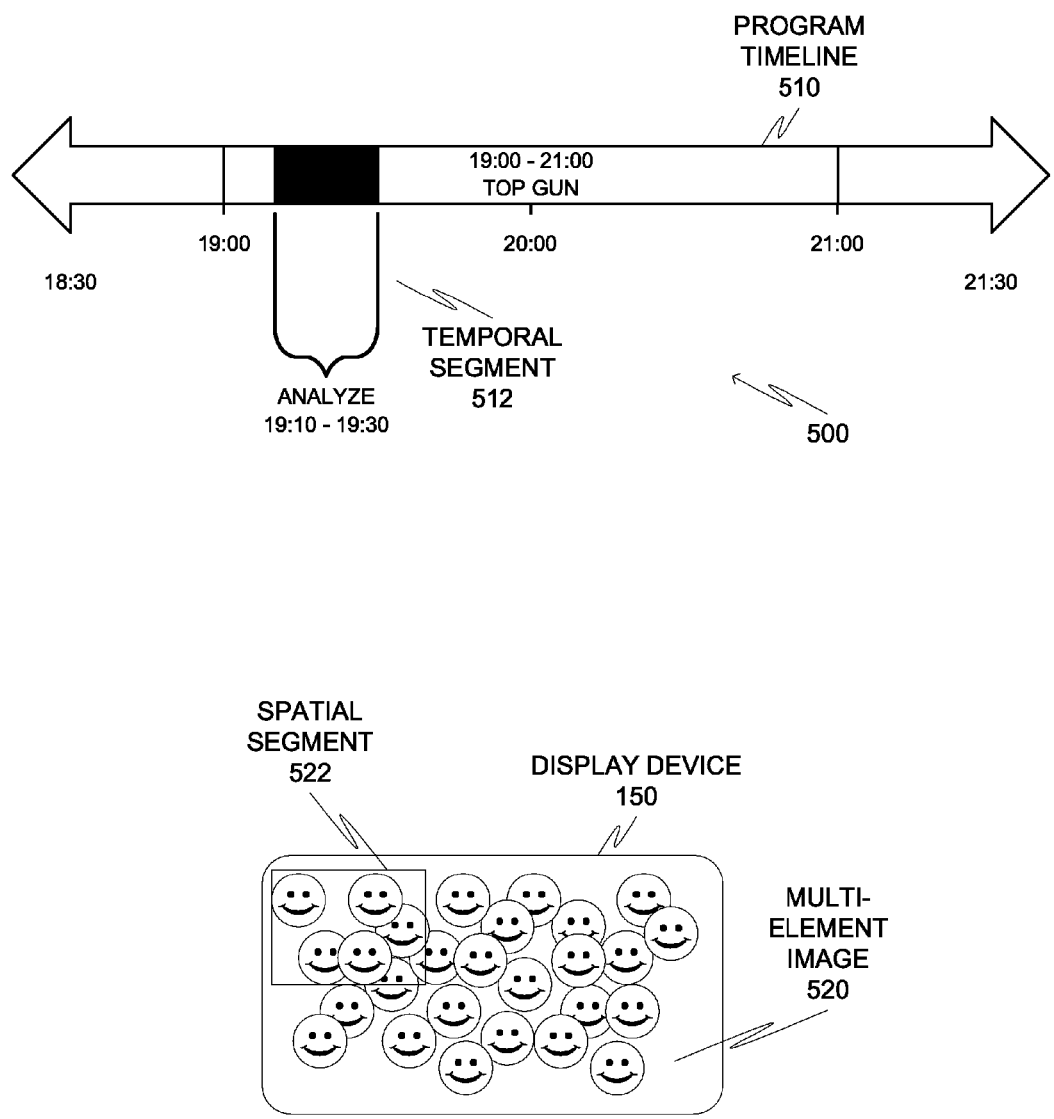
FIG. 5 is a diagrammatic view of a segmented multimedia content stream.

FIG. 5 is a diagrammatic view of a segmented multimedia content stream 500. FIG. 5 illustrates that a program may be both temporally and spatially divided. For example, temporal segment 512 may be part of a program timeline 510. Temporal segment 512 illustrates a case where a 20-minute portion of Top Gun has been designated for analysis. On the other hand, multi-element image 520 includes a large number of faces, which may represent a portion of the crowd attending the UT-A&M game. Spatial segment 522 is designated for analysis. This may be useful, for example, for estimating the demographic composition or school affiliation of the crowd for statistical analysis, or simply for identifying celebrities attending the game live.

Figure 6:
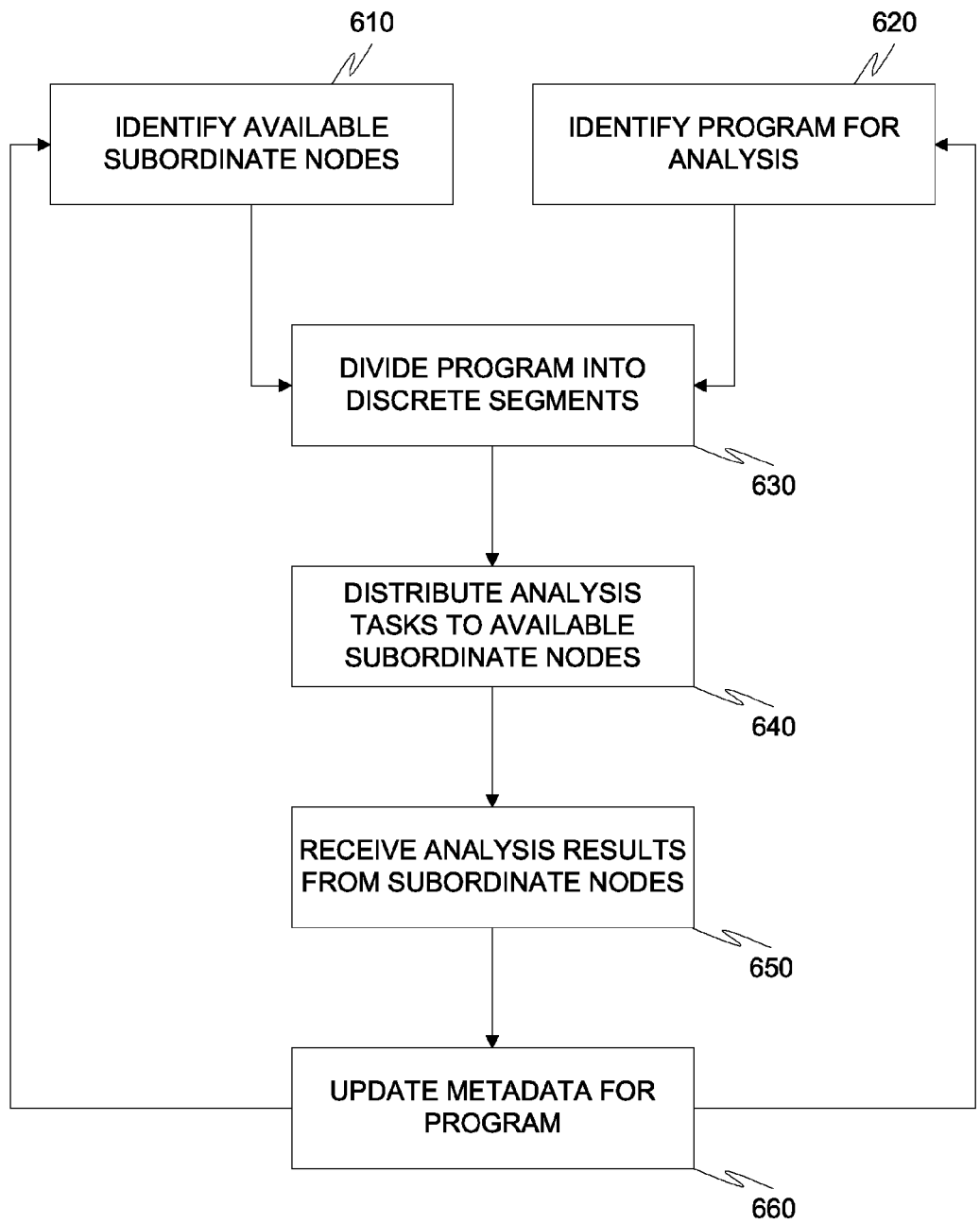
FIG. 6 is a flow diagram disclosing a process whereby a master node assigns analysis tasks to a subordinate node.

FIG. 6 is a flow diagram disclosing a process whereby a master node assigns analysis tasks to a subordinate node. In block 610, master node 110 identifies a program to be analyzed. In block 620, master node 110 identifies subordinate nodes that are available for analysis (for example, subordinate nodes that are either idle or that are tuned to the program). In block 630, the program is divided into discrete segments, which may be any combination of spatial, temporal, and/or functional divisions. For example, a subordinate node 130 may be instructed to perform facial recognition (a functional division) on a 10-minute segment (a temporal division) in the upper-left quadrant of the screen (a spatial division). In block 640, analysis tasks are distributed to subordinate nodes. In block 650, master node 110 receives the results of the analysis. In block 660, the master updates the metadata 480 (FIG. 4) associated with the program.

Figure 7:
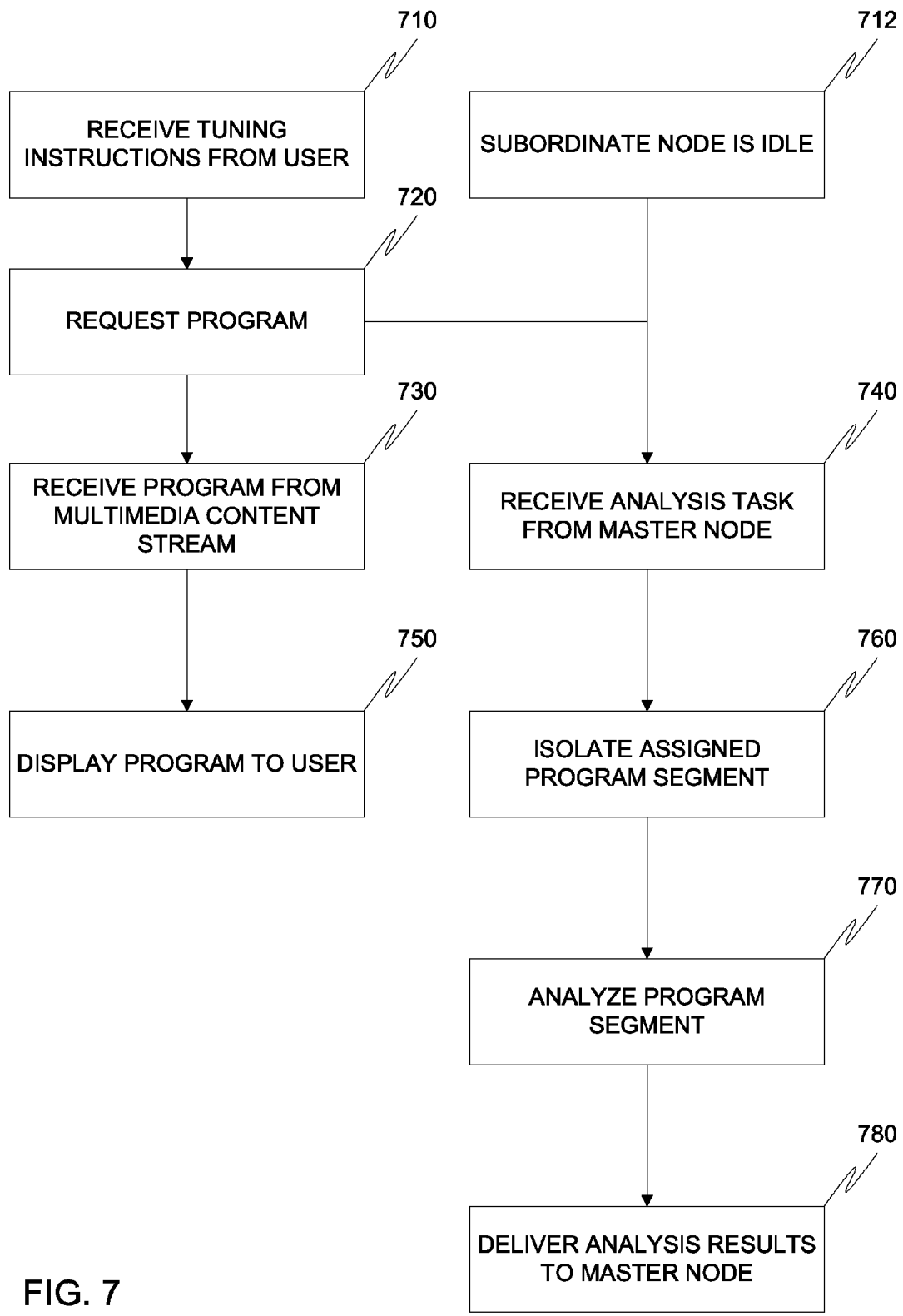
FIG. 7 is a flow diagram disclosing a process whereby a subordinate node performs an analysis task.

FIG. 7 is a flow diagram disclosing a process whereby a subordinate node 130 performs an analysis task. In block 710, subordinate node 130 receives tuning instructions from user 160, associating subordinate node 130 with a particular program. Alternatively, in block 712 subordinate node 130 may be idle. In block 720, subordinate node 130 requests the program. In block 730, subordinate node 130 receives the program from the multimedia service provider. In block 750, subordinate node 130 displays the requested program to user 160. While user 160 is viewing the program, or while subordinate node 130 is idle, subordinate node 130 may perform an analysis task. In block 740, subordinate node 130 receives an analysis task from master node 110. In block 760, subordinate node 130 isolates the assigned program segment from the program. Note that in some cases of temporal segmentation, the stream may not yet be at this point in the program. In that case, subordinate node 130 will either wait for that portion of the program, or master node 110 may provide the assigned segment separately so that subordinate node 130 can begin analysis. In block 770, subordinate node 130 analyzes the multimedia content stream 122 according to its instructions. In block 780, subordinate node 130 delivers the results of its analysis task to master node 110.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A master node in a distributed content analysis network, the master node comprising:
a memory device programmed with instructions, executable by a processor wherein the instructions, when executed by the processor perform operations, the operations comprising:
identifying a program in a multimedia content stream provided to a plurality of subordinate nodes;
dividing the program into discrete segments, wherein each of the plurality of subordinate nodes is associated with a corresponding discrete segment that is different;
assigning analysis tasks to the plurality of subordinate nodes, wherein each of the analysis tasks instructs a different one of the plurality of subordinate nodes to respectively analyze the corresponding discrete segment of the program;
receiving results of the analysis tasks from the plurality of subordinate nodes; and
generating a metadata profile of the program based, at least in part, on the results.

2. The master node of claim 1 wherein the corresponding discrete segment of the program is a spatial segment of a video component of the program as displayed on a screen.

3. The master node of claim 1 wherein the corresponding discrete segment of the program is a temporal segment of the program.

4. The master node of claim 1 wherein the analysis tasks perform pattern matching on the multimedia content stream.

5. The master node of claim 4 wherein the pattern matching includes performing facial recognition to determine a match among a set of predetermined faces.

6. The master node of claim 4 wherein the pattern matching includes parsing an audio component of the program and performing voice recognition on the audio component to determine a match among a set of predetermined voices.

7. The master node of claim 4, wherein the operations further comprise: performing speech-to-text conversion on a portion of an audio component of the program, wherein the pattern matching is performed on text phrases resulting from the speech-to-text conversion.

8. The master node of claim 4 wherein the pattern matching includes parsing a closed-captioning component of the program and performing pattern matching on captions resulting from the parsing.

9. The master node of claim 1 wherein the program is a sport contest and the analysis tasks include instructions to characterize events occurring within the sport contest.

10. The master node of claim 1 wherein at least one of the plurality of subordinate nodes is tuned to the program.

11. The master node of claim 1 wherein the plurality of subordinate nodes includes an idle subordinate node.

12. The master node of claim 1 wherein the plurality of subordinate nodes comprises customer premises equipment.

13. The master node of claim 12 wherein the customer premises equipment comprises a set-top box.

14. A method of analyzing a multimedia content stream, the method comprising:
   transmitting the multimedia content stream to a plurality of subordinate nodes, wherein a master node and the plurality of subordinate nodes communicate in a distributed content analysis network;
   identifying, by the master node, a program in the multimedia content stream for analysis;
   dividing, by the master node, the program into discrete portions, wherein each of the plurality of subordinate nodes is assigned a corresponding discrete portion that is different for each subordinate node;
   distributing analysis tasks to the plurality of subordinate nodes, wherein each of the analysis tasks instructs a different one of the plurality of subordinate nodes to respectively analyze the corresponding discrete portion of the program;
   receiving analysis results from the plurality of subordinate nodes, wherein the analysis results indicate a property of the program; and
   generating a metadata profile, based at least in part on the analysis results, for association with the program.

15. The method of claim 14, further comprising:
   configuring the plurality of subordinate nodes to:
      receive the multimedia content stream;
      perform the analysis tasks received from the master node to analyze the corresponding discrete portion of the program; and
      provide the analysis results to the master node.

16. The method of claim 14 wherein the corresponding discrete portion of the program is a temporal segment of the program.

17. The method of claim 14 wherein the corresponding discrete portion of the program is a spatial segment of a video component of the program.

18. The method of claim 14 wherein the corresponding discrete portion of the program is an audio component of the program.

19. The method of claim 14 wherein the corresponding discrete portion of the program is a closed captioning component of the program.

* * * * *